United States Patent [19]
Sado et al.

[11] 3,981,000
[45] Sept. 14, 1976

[54] SYSTEM FOR CONTROLLING A NUMERAL DISPLAY

[75] Inventors: Ichiro Sado; Mitsuaki Seki, both of Tokyo, Japan

[73] Assignee: Canon Kabushiki Kaisha, Tokyo, Japan

[22] Filed: Aug. 13, 1975

[21] Appl. No.: 604,192

Related U.S. Application Data
[63] Continuation of Ser. No. 430,567, Jan. 3, 1974.

[30] Foreign Application Priority Data
Jan. 16, 1973   Japan.................................. 48-7175
Jan. 23, 1973   Japan.................................. 48-9727

[52] U.S. Cl.......................... 340/324 R; 235/60.34; 235/64.3
[51] Int. Cl.²............................................ G06F 3/14
[58] Field of Search......... 340/324 R, 324 A, 172.5, 340/168 S; 235/64.3, 171, 60.28, 60.34, 60.38

[56]  References Cited
UNITED STATES PATENTS

| | | |
|---|---|---|
| 3,336,587 | 8/1967 | Brown............................. 340/324 A |
| 3,341,838 | 9/1967 | Ragen............................. 340/324 A |
| 3,432,845 | 3/1969 | Douglas et al.................. 340/324 A |
| 3,537,073 | 10/1970 | Sakoda et al..................... 340/324 R |

Primary Examiner—Marshall M. Curtis
Attorney, Agent, or Firm—Fitzpatrick, Cella, Harper & Scinto

[57]  ABSTRACT

The display control system incorporated in an electronic desk top calculator includes mark suppression means for suppressing the display of a mark or marks such as a comma associated with an insignificant digit or digits in addition to the zero suppression of the insignificant digit or digits in a digit position higher than the most significant digit to be displayed, and brightness of the display is improved and flicker is eliminated by holding the displayed information during a time period corresponding to more than one digit time, and overlapped displaying of the numeral, beat and noise are prevented by inserting blanking between adjacent display information signals applied to the displaying units.

29 Claims, 22 Drawing Figures

| BINARY 8421 | DECIMAL | SEQUENCE OF OPERATION |
|---|---|---|
| 0000 | 0  | K → V |
| 0001 | 1  | H → Z → L → V |
| 0010 | 2  | D → Y → M → V |
| 0011 | 3  | D → Y → G → Z → L → V |
| 0100 | 4  | C → X → N → V |
| 0101 | 5  | C → X → J → L → V |
| 0110 | 6  | C → X → E → Y → M → V |
| 0111 | 7  | C → X → E → Y → G → Z → L → V |
| 1000 | 8  | A → W → O → V |
| 1001 | 9  | A → W → I → Z → L → V |
| 1010 | 10 | A → W → F → Y → M → V |
| 1011 | 11 | A → W → F → Y → G → Z → L → V |
| 1100 | 12 | A → W → B → X → N → V |
| 1101 | 13 | A → W → B → X → J → Z → L → V |
| 1110 | 14 | A → W → B → X → E → Y → M → V |
| 1111 | 15 | A → W → B → X → E → Y → G → Z → L → V |

SYSTEM FOR CONTROLLING A NUMERAL DISPLAY

This is a continuation, of application Ser. No. 430,567 filed Jan. 3, 1974.

BACKGROUND OF THE INVENTION

1. Field of the Invention

The present invention relates to generally a system for controlling display of digit position marks such as a comma display control system and more particularly a system adapted to automatically suppress the display of a digit position mark such as a comma in the digit place where the most significant digit of the number is displayed.

2. Description of the Prior Art

The system for suppressing the zero display incorporated in an electronic desktop calculator has been well known to the art and is, for instance, disclosed in U.S. Pat. No. 3,432,845. However, a comma which is used to separate a number displayed into thousands, millions, and other groups of a predetermined number of digits, usually, three digits, is generally not suppressed. There has been devised and demonstrated a system for suppressing a comma or commas in the digit places, where zero suppression is made, by utilizing the zero suppression signal. However, it is extremely difficult or impossible for this system to suppress a comma in the digit place where the most significant digit of the number is displayed. Furthermore the above system is very complex in construction, large in size and very expensive to manufacture.

Furthermore, in the prior art time division display systems, it is difficult to energize the displaying elements for a longer period of time than the time in which one digit is displayed every cycle under the influence of the duty cycle, operating speed of the machine and the brightness of the display used in the machine.

In view of the above, one of the objects of the present invention is to provide a system for controlling display of digit position marks which may suppress the mark such as comma in the digit place where the most significant digit of the number is displayed.

Another object of the present invention is to provide a novel system which may suppress not only a mark such as a comma in the digit place where the most significant digit of the number is displayed but also zeros in the digit places higher than the digit place of the most significant digit.

Still another object of the present invention is to provide a system for controlling a numeral display in which the brightness of the display is improved and the flicker is eliminated by holding the displayed information during a time period corresponding to more than one digit time.

Still another object of the present invention is to provide an improved system for controlling the numeral display in which overlapped displaying of the numeral, beat and noise are prevented by inserting blanking between adjacent display information signals applied to the displaying units.

The above and other objects, features and advantages of the present invention will become more apparent from the following description of some preferred embodiments thereof taken in conjunction with the accompanying drawing.

BRIEF DESCRIPTION OF THE DRAWINGS

FIG. 9 consisting of FIGS. 9A and 9B is a timing chart used for the explanation of the mode of operation thereof;

FIG. 12 consisting of FIGS. 12A and 12B is a timing chart used for the explanation of the mode of operation thereof;

DESCRIPTION OF THE PREFERRED EMBODIMENTS

Figure 1:
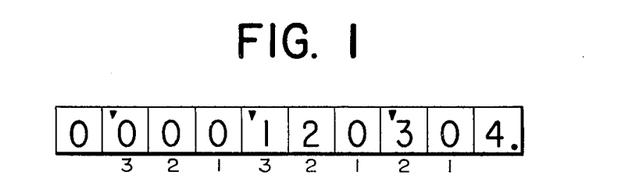
FIG. 1 shows an example of a number displayed by an prior art display divice.
Figure 2:
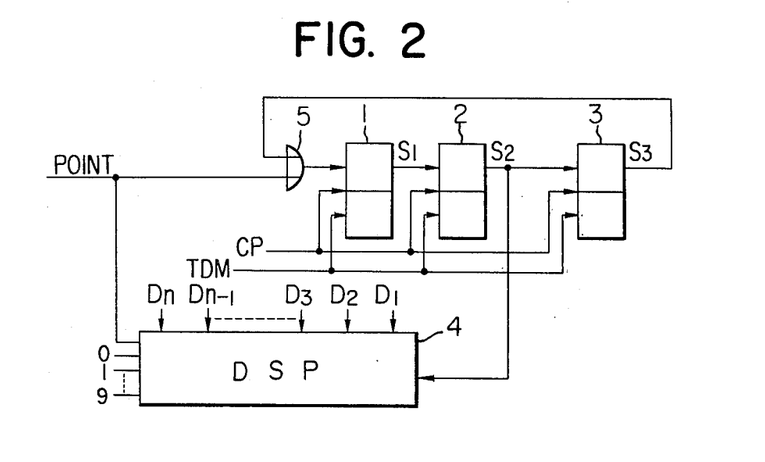
FIG. 2 is a circuit diagram of the system used for the prior art shown in FIG. 1.
Figure 3:
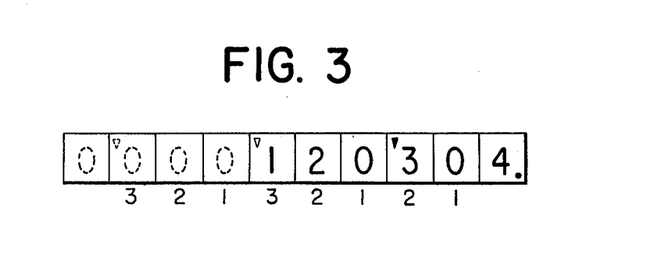
FIG. 3 shows an example of a number displayed by a display device incorporating the control system in accordance with the present invention.

Prior Art (FIGS. 1 and 2)

Figure 5:
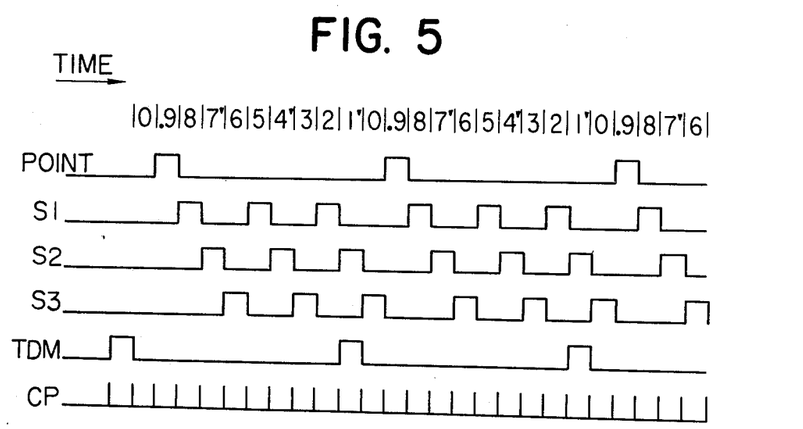
FIG. 5 is a timing chart used for the explanation of the mode of operation of the prior art display device shown in FIG. 2.

Prior to the description of the preferred embodiments of the present invention, the prior art comma display system will be briefly described with reference to FIGS. 1 and 2 in order to point out the problems thereof, which the present invention contemplates to overcome. Among the digits displayed in FIG. 1, four zeros in the higher-order digit places, the comma (') displayed in the next most significant digit place of the display device, and the comma (') displayed together with the most significant digit 1 are not required to be displayed. In the prior art display device shown in FIG. 2, three flip-flops 1, 2 and 3 make up a circulating shift register, and the commas are displayed every three digit places. (The first comma representing thousands is spaced apart from the decimal point (.) by two digit place. FIG. 5 is a timing chart used for the explanation of the mode of operation of the display device shown in FIG. 2. Signal TDM represents the end of one word.

Because of the above arrangement of the prior art device, the suppression of insignificant zeros and commas cannot be made.

Figure 4:
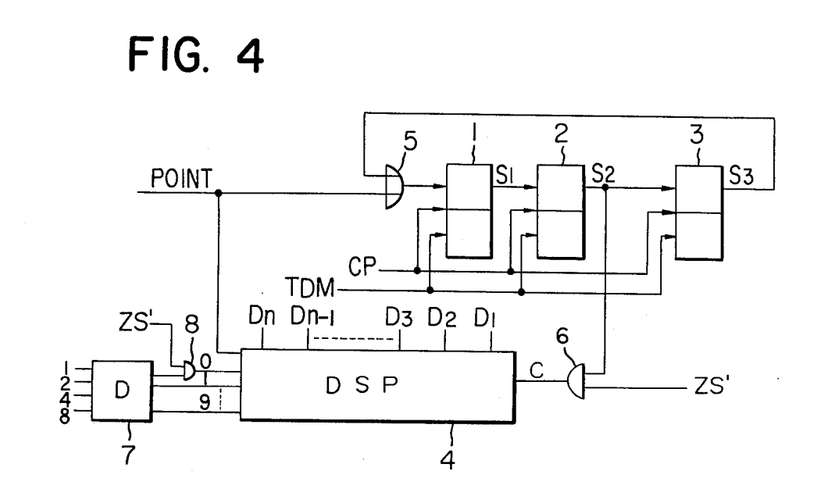
FIG. 4 is a circuit diagram of the system in accordance with the invention.
Figure 6:
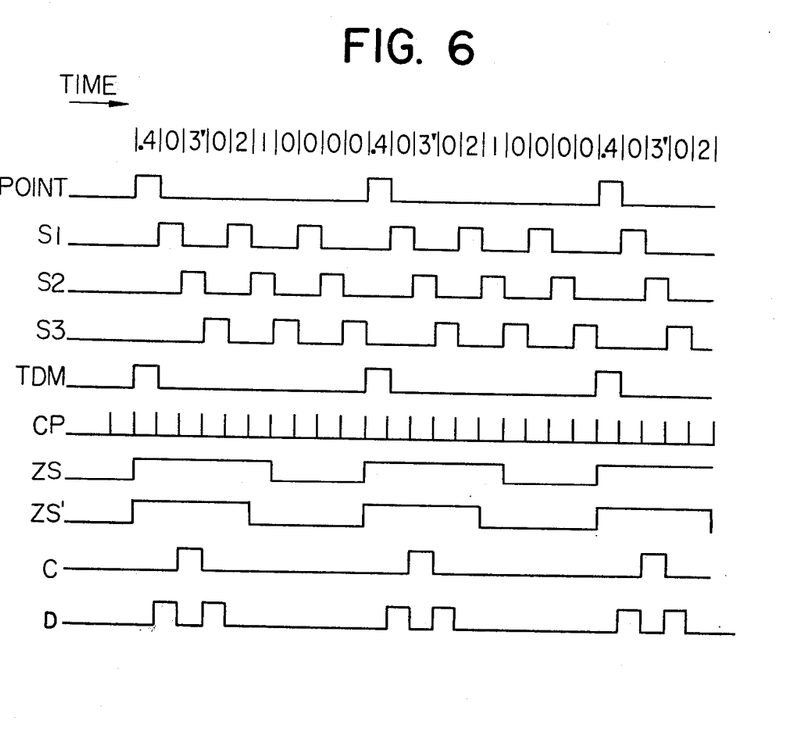
FIG. 6 is a timing chart used for the explanation of the mode of operation of the display control system shown in FIG. 4.
Figure 7:
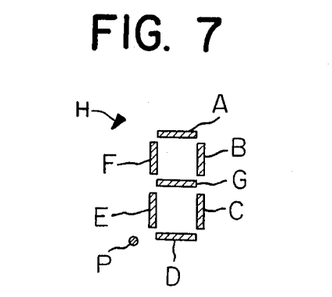
FIG. 7 shows seven-bar segments which are selectively energized to display a digit.
Figure 15:
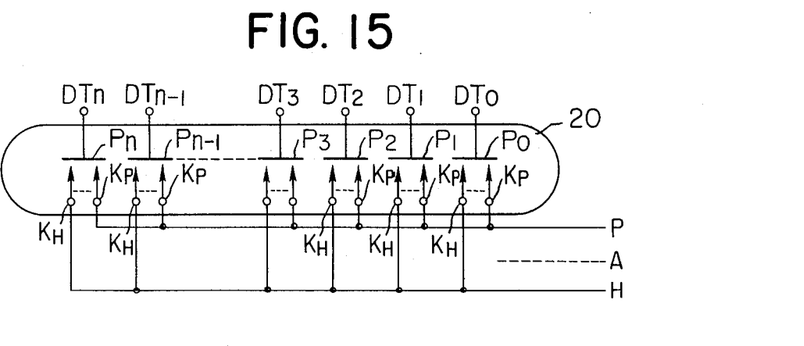
FIG. 15 is a schematic view of a multi-digit display tube.

Referring to FIG. 4, the output S2 of a circulating shift register is controlled by an AND gate 6. That is, the output S2 is applied to one input terminal of the AND gate 6 while the control signal ZS' is applied to the other input terminal. According to the present invention, such simple arrangement permits the suppression of the display of a comma in the digit place of the most significant digit of a numeral displayed. As shown in FIG. 6, the pulse duration of the control signal ZS' is shorter than the zero suppression signal ZS by one digit at its trailing edge. When the control signal ZS' is applied simultaneously with the comma display signal S2 to the AND gate 6, the latter provides the output signal C so that the insignificant commas may be suppressed. It is preferable to generate the control signal ZS' based upon the zero suppression signal ZS as will be described in more detail hereinafter. The control signal ZS' is used to supress the insignificant commas in the higher-order digit places. As shown in FIG. 4, only 0 output line of a decoder 7 is controlled by an AND gate 8 whose output D is shown in FIG. 6 so that the most significant digit 1 is displayed, but the comma in the digit place of the most significant digit 1, the comma and zeros in the digit place higher than that of the most significant digit 1 may be suppressed. A display device 4 is dynamically driven in a series-time-division manner as shown in FIG. 15. When the decimal-point segment is located adjacent to the left lower upright bar segment as shown in FIG. 7, the output S3 of the flip-flop 3 is used as a comma display signal.

Figure 8:
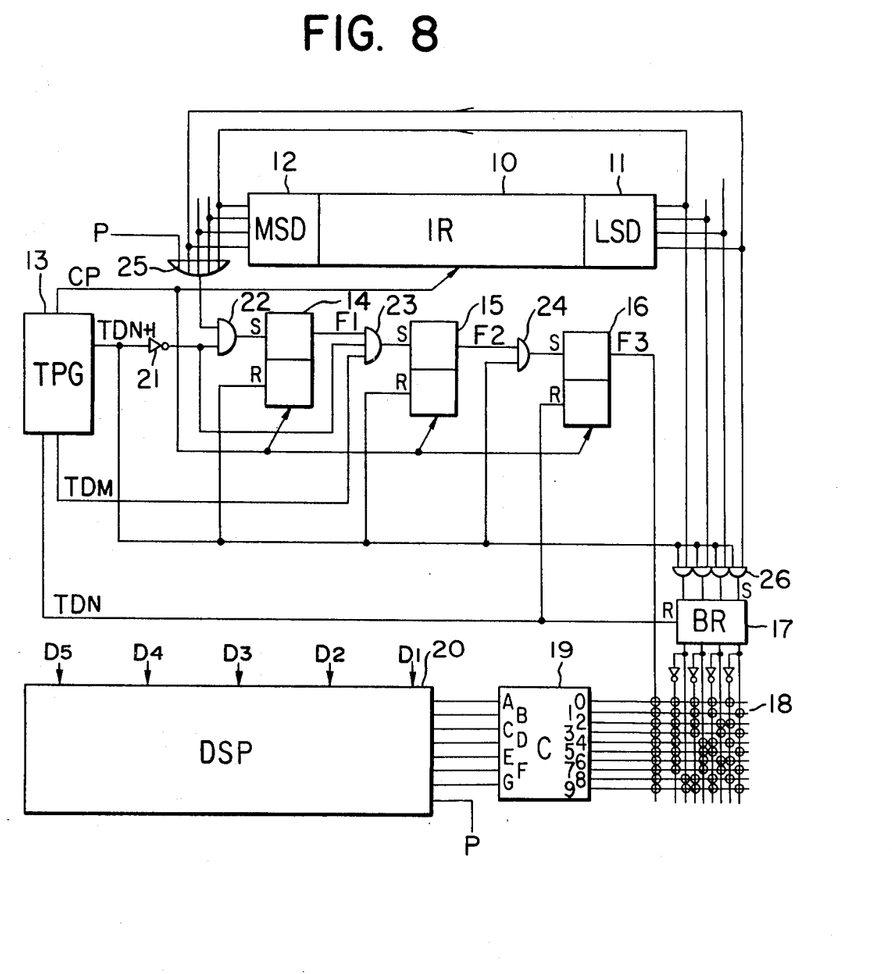
FIG. 8 is a circuit diagram of one embodiment of the system of the present invention for generating the zero suppression signal ZS.
Figure 14:
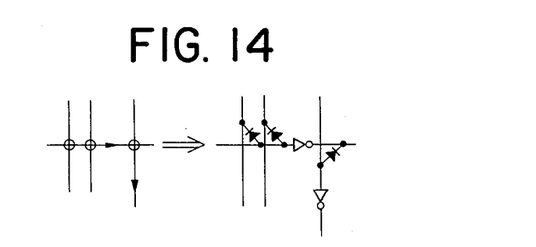
FIG. 14 is a gragmentary detailed diagram of the decoder matrix as shown in the conversion circuit.

Next referring to FIGS. 8 and 11, one embodiment of a system for generating the control signals ZS and ZS' will be described hereinafter. In FIG. 8, 10 designates a circulating shift register which stores bits in parallel and digits in series, the least significant digit LSD being designated by 11 while the most significant digit MSD by 12; 13, a timing pulse generator for generating control pulses; 14, 15 and 16, flip-flops making up a zero-suppression circuit; 17, a buffer register into which is transferred one digit information from the shift register 10; 18, a decoder the detail of which is illustrated in FIG. 14; 19, an encoder; and 20, a display device of the type shown in FIG. 15.

It is assumed in the instant embodiment that the shift register 10 be one of the type in which four bits are stored in parallel while five digits are stored in series and that a numeral 00123 be stored in the order named from the MSD to the LSD place.

The significant digits to be displayed are 123 and the zeros in the digit places higher than the digit place of the most significant digit 1 must be supressed.

Figure 9A:
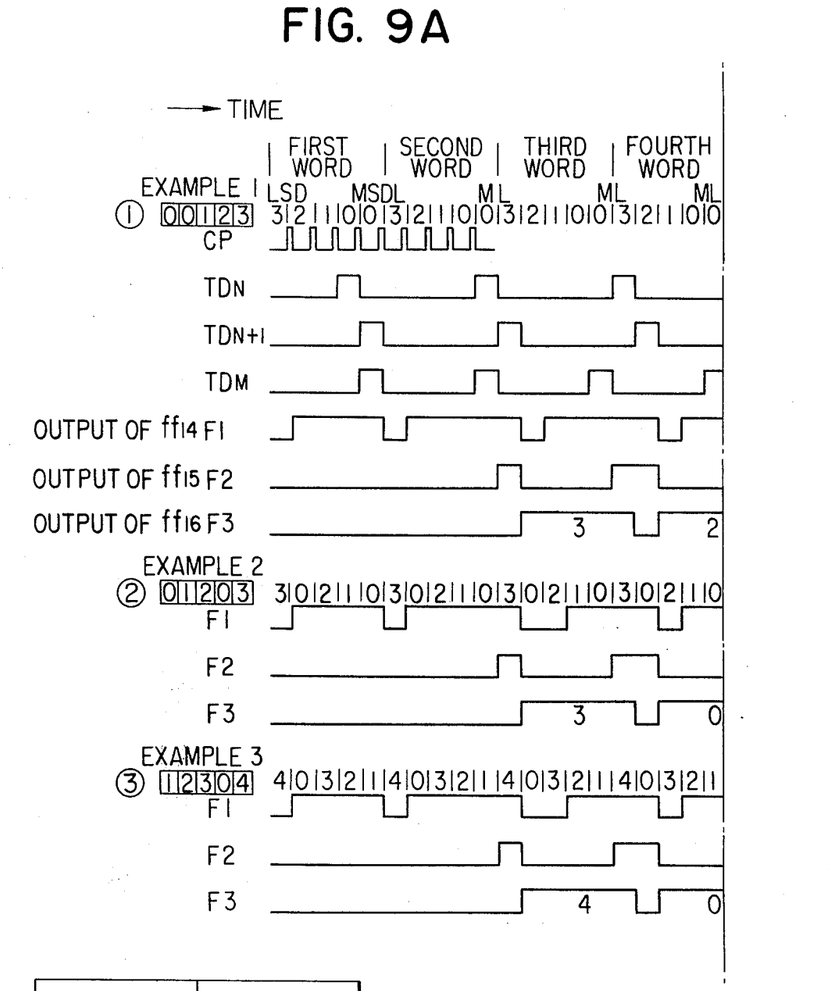
Figure 9B:
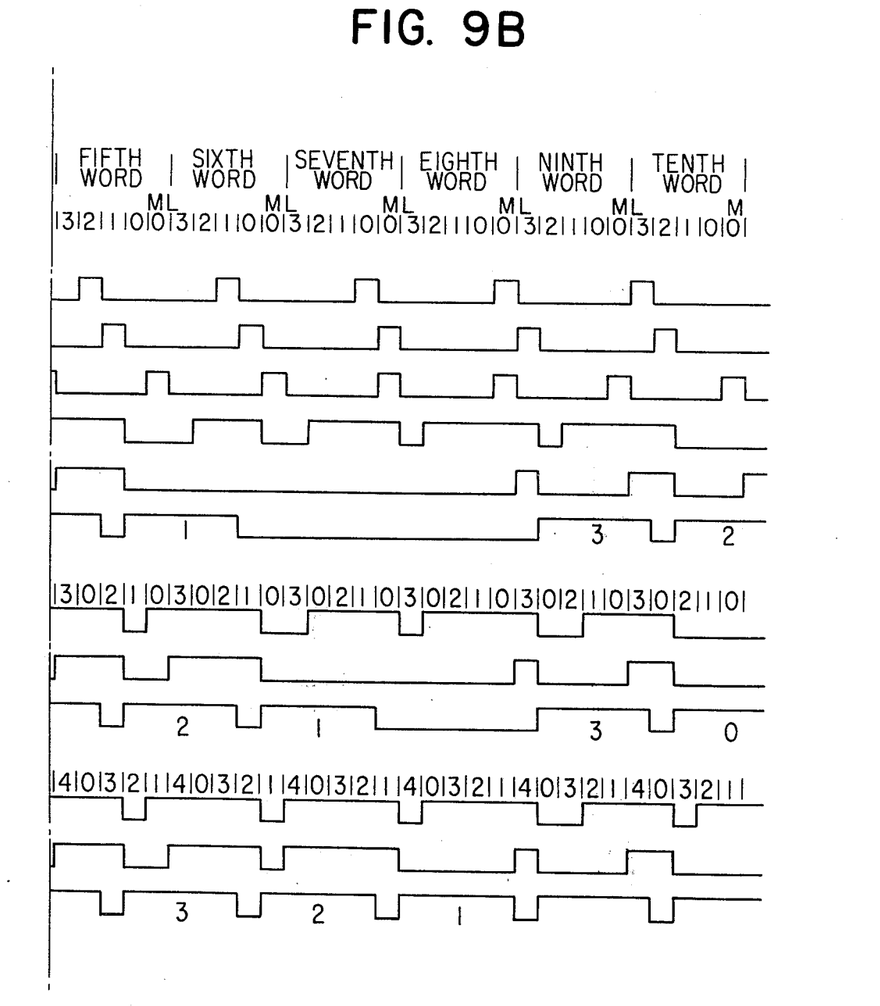
Figure 10:
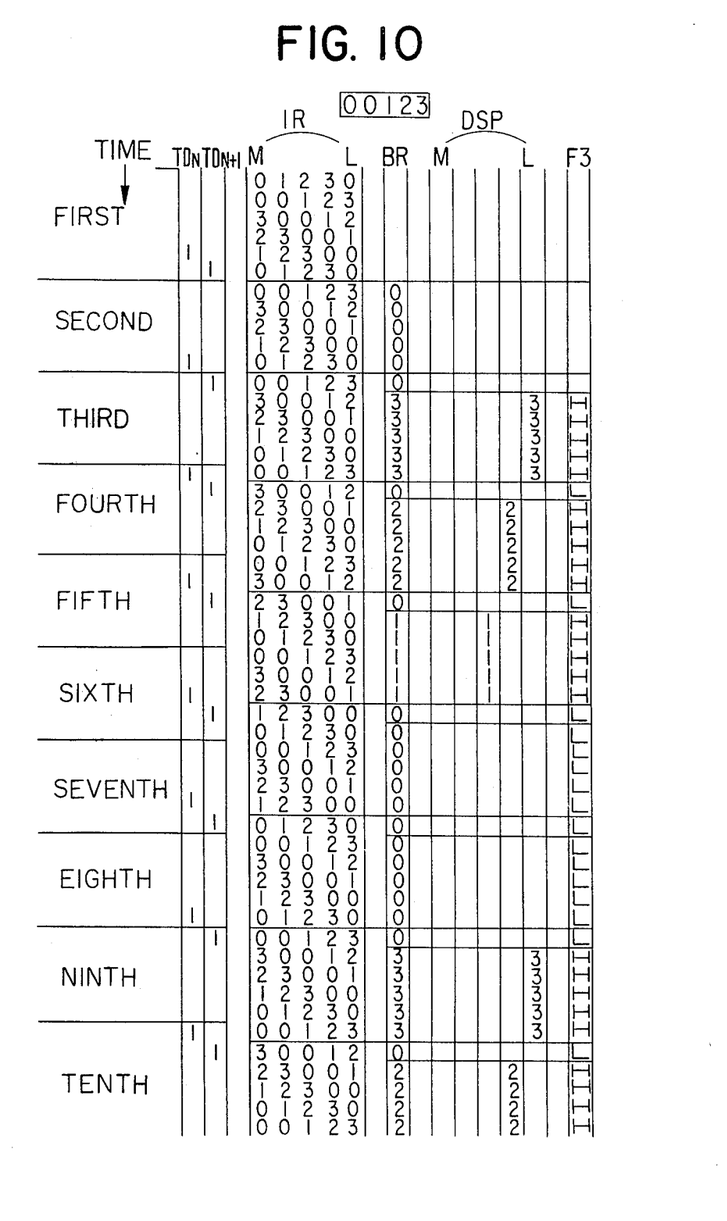
FIG. 10 is a table used for the explanation of the shift of digits in conjunction with FIG. 9.

The timing pulse generator TPG generates the timing signals CP, $TD_N$, $TD_{N+1}$, and $TD_M$ as shown in FIG. 9. The signal CP is clock pulse. The pulse duration of the control signal $TD_M$ equals a time interval during which the most significant digit of one word is shifted into and stored in the LSD place, and rises to a high level for one digit time. The clock pulse CP and the control pulse $TD_M$ are synchronized with the circulation frequency of the shift register 10. Independently of the circulating frequency of the shift register 10, the control signal $TD_N$ representing the timing of the digit place higher than the number of digits of the shift register 10 by one digit place and the control signal $TD_{N+1}$ which lags behind the control signal $TD_N$ are also generated as shown in FIG. 9.

In the initial state, which will be referred to as the first word in this specification, the control signals $TD_{N+1}$ and $TD_M$ are generated at the same time. At the last digit time of the first word, the content 0 stored in the LSD place in the shift register 10 is transferred into the buffer register 17 as an AND gate 26 is opened in response to the control signal $TD_{N+1}$. The buffer register 17 has been already cleared in response to the clear signal $TD_N$ one digit time before the AND gate 26 is opened. The data 00123 are circulated through a circulation loop and an AND gate 22 in the order named and applied to the flip-flop 14. When the control signal $TD_{N+1}$ rises to a high level, the AND gate 22 is closed so that no data may be applied to the flip-flop 14 which is an input stage of the zero suppression circuit. During this time, one digit information is transferred (or written) into the buffer register 17 from the shift register 10.

The first digit applied to the AND gate 22 is not zero but digit 3, and the AND gate 22 is opened. Therefore, as shown at 1 in FIG. 9, the flip-flop 14 is set in response to either of the rising bits of the binary coded signal 0011 of the decimal digit 3 and in synchronism with the trailing edge or fall of the clock pulse CP, and keeps providing the high-level output until it is reset in response to the fall of the control signal $TD_{N+1}$.

At the end of the first word, the data are again stored in the shift register 10 in the same order with the initial order. In the second word, the flip-flop 14 is set in the manner described hereinbefore, and the AND gate 26 is opened in response to the control signal $TD_{N+1}$ at the last digit time in the first word so that the content 0 in the MSD place of the shift register 10 and transferred into the buffer register 17 is perfunctorily cleared in response to the fall of the clear signal $TD_N$.

At the end of the second word, the conditions for setting the flip-flops 15 are satisfied. That is, the flip-flop 15 is so arranged that it may be set in response to the fall of the most significant digit signal $TD_M$ when the latter is generated while the control signal $TD_{N+1}$ is not present after the flip-flop 14 has been set. Therefore, the flip-flop 15 is set at the end of the second word, that is the start of the third word. In the second word, the control signal $TD_{N+1}$ has no chance to rise to a high level so that the no digit information may be transferred into the buffer register 17 from the shift register 10. Therefore no digit is displayed at all.

In the third word, the content (3) in the LSD place of the shift register 10 is transferred into the buffer register 17 in response to the control signal $TD_{N+1}$. During this digit time, the flip-flop 15 continues to provide the high-level set signal so that an AND gate 24 is ready to open. The flip-flop 16 is set in response to the fall of the control signal $TD_{N+1}$.

The flip-flop 15 is reset in response to the fall of the signal $TD_{N+1}$. The set output F3 of the flip-flop 16 is applied to the lines of the decoder matrix 18 for decoding decimal digits 0 to 9 as AND condition. Therefore, when the content of the buffer register 17 is 3, its binary coded signal 0011 is decoded into the decimal digit 3 and the digit 3 is displayed by the display device 20. As described hereinbefore, the content stored in the buffer register 17 is 3 which is the digit stored in the LSD place in the shift register 10 and the flip-flop 16 provides the output F3, the digit 3 is displayed at the least significant digit place in the display device 20. In this case, the least significant digit pulse $D_1$ is applied to the display device 20 as the latter is dynamically driven in the time-division manner. The buffer register 10 is so arranged as to hold its content for at least one word time.

When one digit information stored in the shift register is transferred into the buffer register 17 in response to the control signal $TD_{N+1}$, the buffer register 17 holds the one digit information until it is reset in response to the clear signal $TD_N$. Thus, the buffer register 17 holds the content for at least one word time (five digit time) during the time the control signal $TD_{N+1}$ appears until the time the control signal $TD_N$ appears. The digit pulse $D_1$ is of course applied for at least one word time. While in the prior art display device provides only one digit time (four bit time) for dynamically turning on a display tube, the present invention may provides a sufficient drive time or N digit time (one word time), where N is the number of digits of the shift register 10, so that the dynamic display without flicker and failure in turning on a display unit may be effected.

Figure 16:
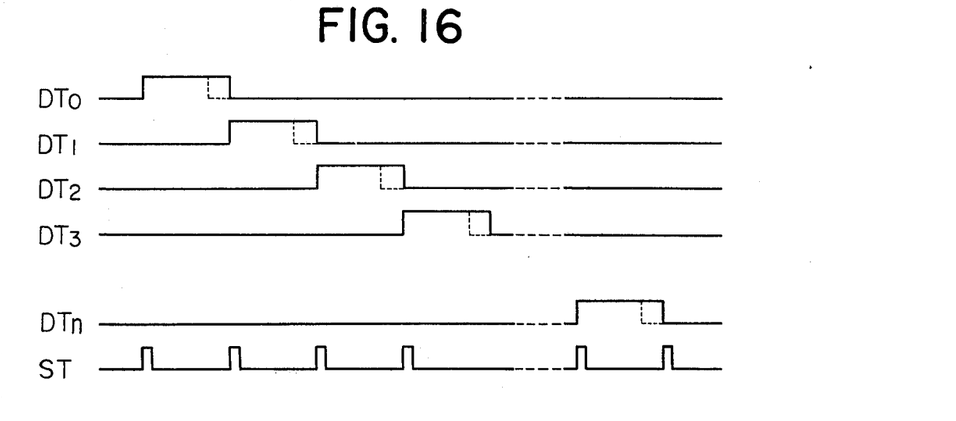
FIG. 16 is a timing chart of digit pulses.

It is most preferable to use in the present invention a multi-digit display tube of the type in which a plurality of discharge indicating tubes are formed into a unitized construction as shown in FIG. 15 because the longer the drive time, the longer voltage time may be obtained for driving one digit. Furthermore, the voltages which are sequentially applied may be spaced apart from each other as shown in FIG. 9 so that the overlapped display, flicker and noise may be eliminated by the provision of a blank time. (The overlapped display, flicker and noise are caused when the digit pulses as shown in FIG. 16 are used). Alternatively, the present invention may be applied to a printer so that the sufficient energy for printing one digit may be obtained. The present invention may eliminate a special buffer memory used in the prior art device. Furthermore the blank time is positively used in order to dessipate heat from or cool an element of a printing head such as a thermal head which is heated in printing.

Now the third word has been completed so that the fourth word is started. In the fourth word, the content 3 stored in the buffer 17 in the third word is cleared in response to the fall of the control signal $TD_N$ in the first LSD time, and the content 2 in the next least significant digit place is transferred into the buffer 17 in response to the control signal $TD_{N+1}$. The flip-flop 16 is reset in response to the fall of the clear signal $TD_N$.

In the last digit time of the third word, the signal $TD_M$ rises to a high level in the manner described above, and the flip-flop 15 is set in response to the fall of the control signal $TD_M$ in the manner described hereinbefore. After one digit time, the control signal $TD_{N+1}$ which is applied to the reset input terminal falls immediately after one digit time, so that the flip-flop 15 is reset in response to the fall of the signal $TD_{N+1}$. That is, the flip-flop 15 is set for two digit time for LSD and LSD +1.

In response to the output F2 of the flip-flop 15 and the control signal $TD_{N+1}$ the AND gate 24 is opened so that the flip-flop 16 is set again in response to the fall of the control signal $TD_{N+1}$. One digit reset time of the flip-flop 16 is a blank time for display described hereinbefore. The blank time serves to prevent overlapped display, flicker and noise.

In the fifth word, the similar steps are cycled so that the content 1 in the third digit place from LSD is transferred into the buffer register 17 from the shift register 10, and the flip-flop 15 keeps the high-level output for three digit time. Thus, the number of digits to be displayed is stored in the terms of digit time.

The content in the fourth digit place is zero so that the flip-flop 14 is not set in the fifth word, which is different from the previous words. That is, this zero must be suppressed and should not be displayed.

The flip-flop 16 is set in response to the output F2 of the flip-flop 15 so that the display of the digit 1 is started. At the end of the fifth word, that is at the start of the 6th word, the output of the flip-flop 15 which has been set until the previous word does not rise to a high level so that the time when the flip-flop 15 is set in the fourth word, that is three digit time is detected as the final effective digit time for display. In the sixth word, the flip-flop 14 is set in response to the content 3 in the LSD place in the shift register 10 as in the case of the first word. The flip-flop 16 remains set, but it is reset in response to the fall of the control signal $TD_N$ which arries at the third digit. The content 1 stored in the buffer 17 is cleared in response to the control signal $TD_N$, and the content 0 (which sould not be displayed) in the fourth digit place is transferred into the buffer 17 in response to the control signal $TD_{N+1}$. However, the output F3 of the flip-flop 16 has already fallen to a low level, no display signal is transmitted from the decoder 18 so that the zero is not displayed in the fourth digit place in the display device 20.

In the seventh word which is similar to the first word (the first to sixth words forming one display cycle), the content 0 stored in the buffer register 17 is cleared in response to the clear signal $TD_N$, and the content (0) in the fifth digit place is transferred into the buffer 17 in response to the control signal $TD_{N+1}$.

Since the flip-flop 16 provides no output signal F3 so that the zero is not displayed. That is, the content zero in the fifth digit (MSD) place in the shift register 10 is suppressed. The above one cycle is repeated so that the two zeros in the higher order digit places are suppressed so that only 123 may be displayed.

The digit pulses D1, D2, . . . and D5 are applied for at least one word time, and it is preferable but not necessary to provide a spacing between the adjacent digit pulses D. The digit pulses $DT_0$ to $DT_n$ as shown in FIG. 16 may be used. In FIG. 16, the digit pulses indicated by the broken lines represent the digit pulses with blanking time. The digit pulses D1 to D5 are sequentially applied independently of the digit places at which the display of zeros are suppressed. Alternatively, it is easily realized to apply the output F3 of the flip-flop 16 to a digit pulse control circuit so that the zero suppression may be effected. In other words, it is not necessary to control the output of the zero suppression circuit by the decoder.

In FIG. 9, 2 and 3 show two other examples of different numerals. 3 shows an example which requires no zero suppression.

Figure 11:
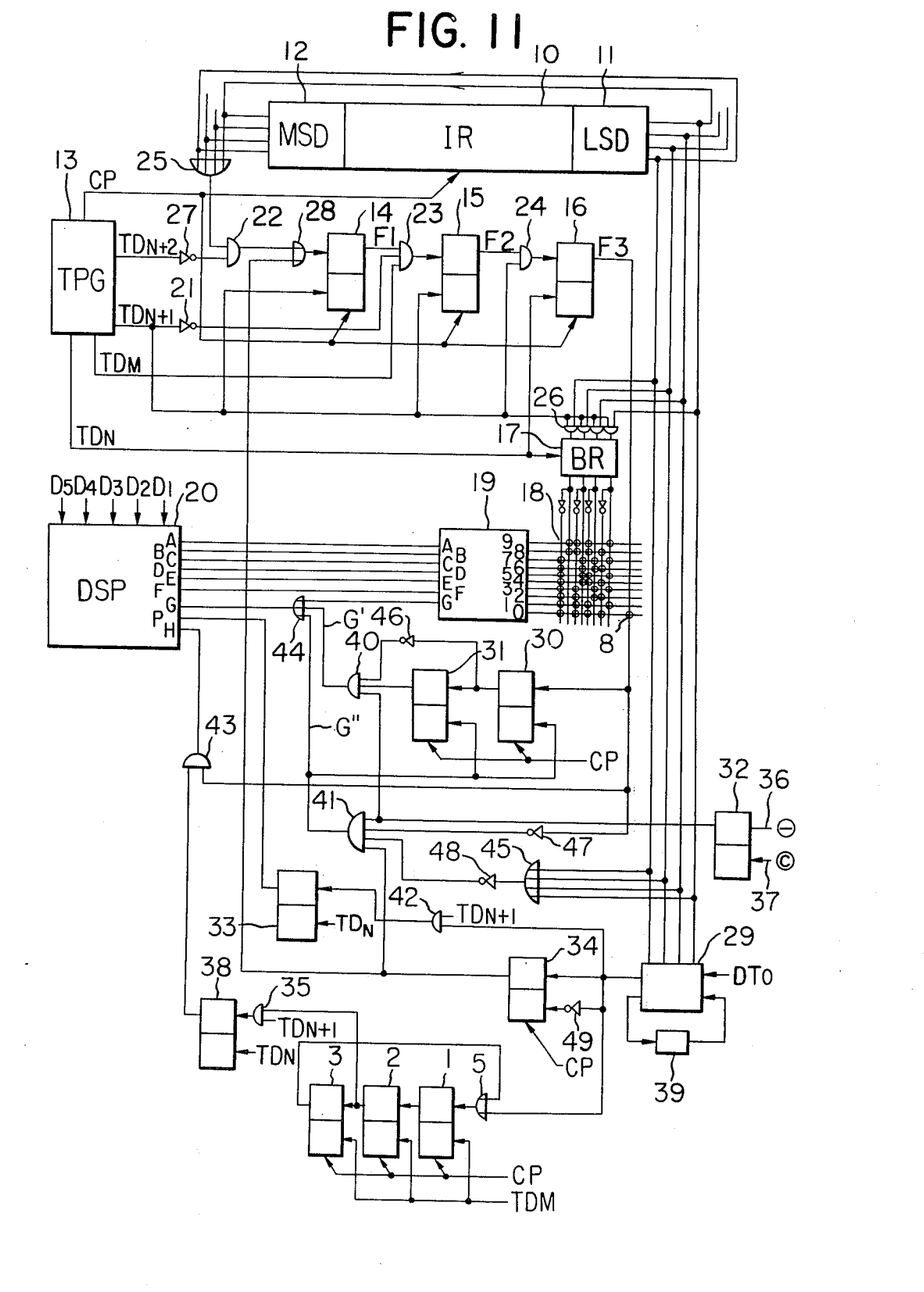
FIG. 11 is a diagram of a circuit adapted to generate another zero suppression signal ZS'.
Figure 12A:
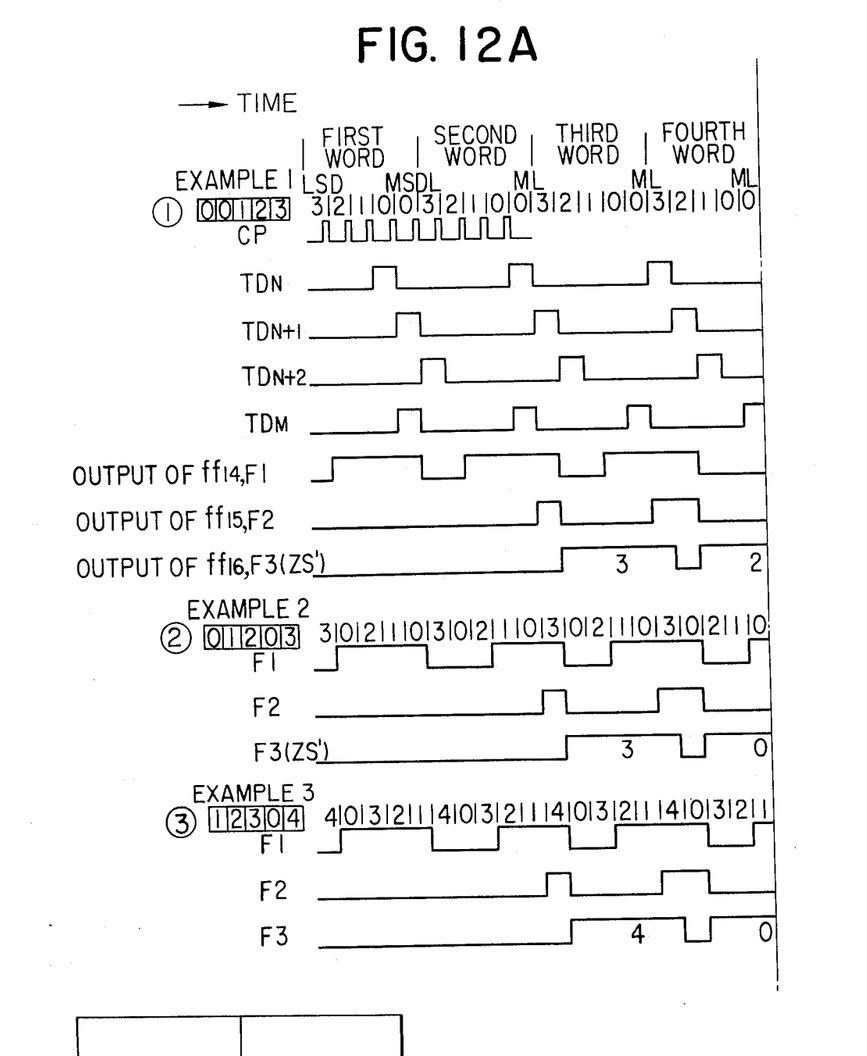
Figure 12B:
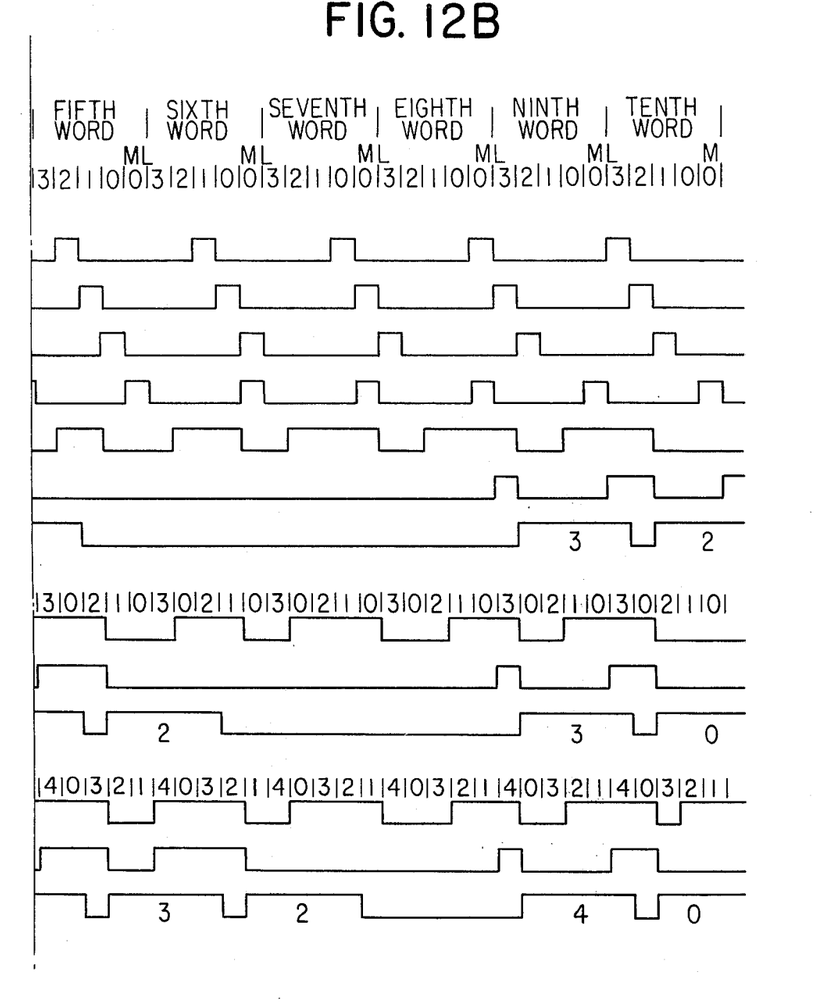

FIG. 11 shows a diagram of a circuit adapted to provide the control signal ZS' based upon the zero suppression signal ZS generated by the circuit shown in FIG. 8. As described hereinbefore, the control signal ZS' is shorter at the trailing edge than the zero suppression signal ZS by a pulse duration equal to one digit time. The timing pulse generator 13 generates the control signal $TD_{N+2}$ which is delayed from the control signal $TD_{N+1}$ by one digit time. The control signal $TD_{N+2}$ is used to control the AND gate 22 so that the output F3 of the flip-flop shown in FIG. 12 will not generate the output for displaying the MSD 1. Thus, the control signal ZS' may be generated. The control signal ZS' is permitted to be applied only to an AND gate 8 as described hereinbefore, and is not permitted to be applied to all lines 0–9 as shown in FIG. 8.

In FIG. 11, reference numerals 1, 2 and 3 designate flip-flops which make up a circulating register which is used for displaying commas representing thousands, millions, and so on; 38, a flip-flop adapted to hold the output of the circulating register for one digit time; 43, an AND gate which corresponds to the AND gate 6 shown in FIG. 4; 29, a converter adapted to convert the static positional information of a decimal point transmitted from the display device 20 into the dynamic time information as will be described in more detail hereinafter; and 33, a flip-flop adapted to hold the decimal point information P from the converter 29 for one word time. The outputs of the flip-flop 33 and 38 which continue for one word time serve to increase the brightness of the display signals by the display device 20. With the above arrangement, the zero suppression signal is ZS' so that when a numeral to be displayed is 0.12, the zero is suppressed. In order to overcome this problem, a flip-flop 34 is provided to delay the signal by one digit time. A flip-flop 32 is provided in order to display the negative sign by using the bar segment G of the seven-bar segments shown in FIG. 7 in the digit place higher than the most significant digit place by one digit in such a way that for instance a numeral -123 may be displayed. To the set terminal 36 of the flipflop 32 is applied the output of the keyboard of the electronic desk top calculator when the minus sign key is depressed or the signal from the arithematic unit representing the minus numeral so that the minus sign may be displayed. Flip-flops 30 and 31 delay the zero suppression signal ZS' by two digit time. Then the numeral -123 may be displayed. The prior art techniques similar to the present invention is disclosed for instance in U.S. Pat. No. 3,646,544, but it should be noted that the present invention has a distinct feature that the suppression of commas may be also accomplished simultaneously.

Figure 13:
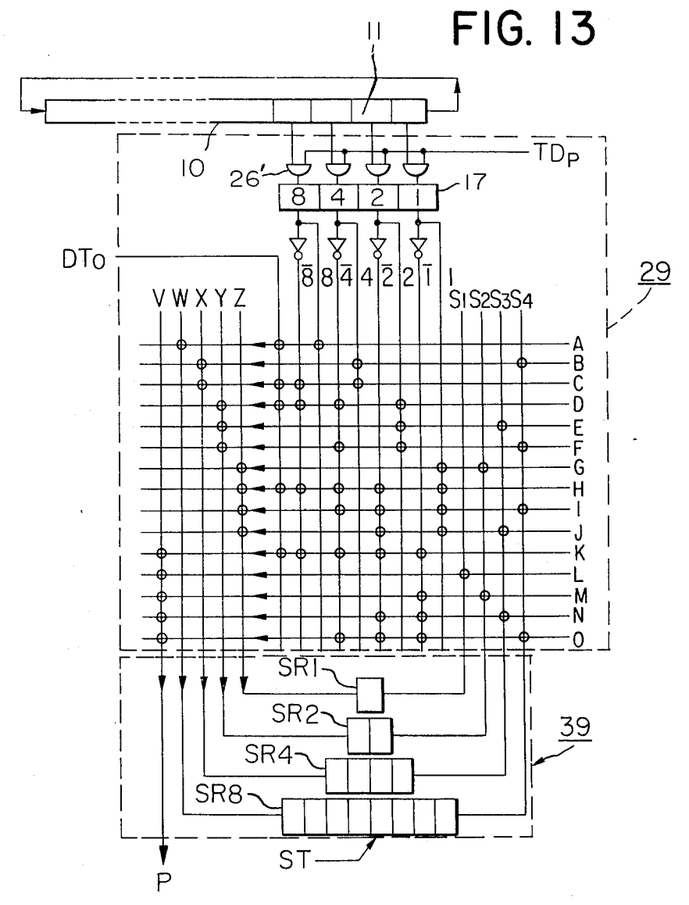
FIG. 13 is a detailed diagram of conversion circuit shown in FIG. 11.
Figure 17:
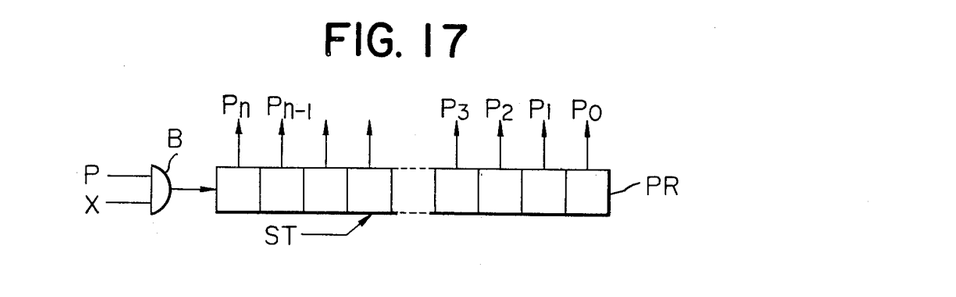
FIG. 17 is a diagram of a circuit adapted to convert the dynamic decimal point timing information into the static decimal point digit place information.
Figure 18:
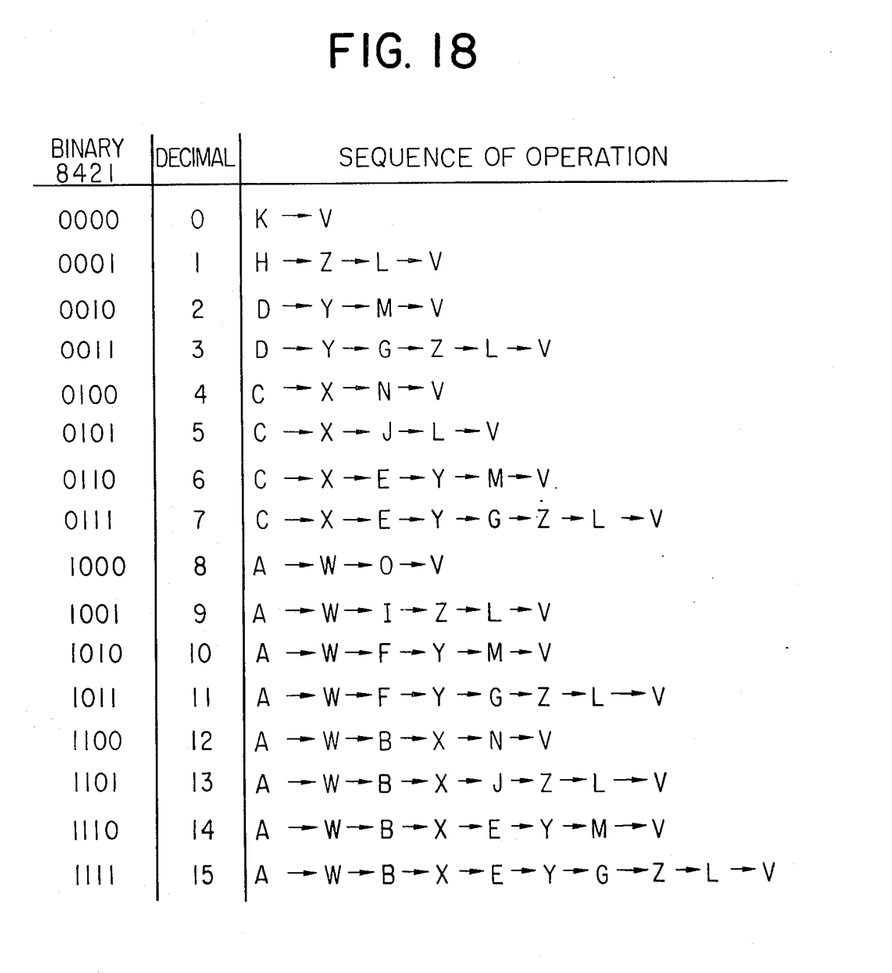
FIG. 18 is a table used for the explanation of the sequence of operation in case of the decimal point display.

Next referring to FIG. 13, the conversion circuit will be described in more detail hereinafter. 29 is a selection means (for instance, a diode matrix circuit) to which is applied the content stored in the memory, and 39 a delay means (for instance a shift register) for delaying and feeding back the content of the selection means. It is assumed that the shift register 10 store therein and circulate therethrough a decimal point information in addition to the numeral information. When the decimal point information is shifted into the LSD place of the shift register 10, the timing signal $TD_{N+1}$ is applied to one of the input terminals of the AND gate 26 so that the decimal point information is transferred into the buffer register 17. That is, the digit place at which the decimal point is to be displayed in the display device is stored in the buffer register 17. Alternatively, the decimal digit information may be transferred into the buffer 17 from a decimal point circuit or a control circuit which controls the digit position in the display device for displaying other specific signs or symbols. In summary, the binary coded information representing a specific digit place in the display device must be stored in the buffer register 17. The digit place information output is applied to the diode matrix 29 together with the signal $DT_0$ shown in FIG. 16 which represents the least significant digit place in the display device or register. It is assumed here that the decimal point must be displayed in the least significant digit place because the number to be displayed is an integer. Then the digit place of the decimal point is assumed to be the 0 digit place which is represented by the binary coded signal 0000 and stored in the buffer register 17. When the output of the buffer register 17 is applied to the diode matrix 29, the outputs of the lines 1, 2, 4 and 8 are logic 1s, and the logic products with the least significant digit place signal $DT_0$ are produced so that only the horizontal line K provides the output. The logic sum of the output line K is obtained at the vertical line V in the logic addition stage so that the decimal point digit place timing information P is derived from the line V. Therefore the decimal point is displayed in the least significant digit place in the display device shown in FIG. 15 at the time $DT_0$. The sequence of this operation is shown at the top of the table shown in FIG. 18. The next row shows the sequence of operation for displaying the decimal point at the first digit place (in practice the second digit place from the right) in the display device. For example when a numeral 34.5 is to be displayed, the binary coded signal 0001 is stored in the buffer register so that the logic 1s appear on the lines 1, 2, 4 and 8. The logic product with the digit timing signal $DT_0$ appears on the logic product line H, and the logic 1 output appears on the line Z. The output is delayed by one digit time by a delay shift register SR1 (one digit time by) a delay shift register SR1 (one digit time delay flip-flop) and fed back to the line S1 in the logic product stage. Therefore, the decimal point timing information P appears on the line V one digit time after the output appears on the line L so that the decimal point is displayed in the first digit place (the second digital place from the right) at DT1 when the decimal point is to be displayed in the seventh digit place (the eighth place in practice), the binary coded signal 0111 is stored in the buffer register 17. As shown in FIG. 18, 0111, the output appears on the line C and then on the line X and is transferred to a delay shift register SR4 in which the content is shifted in response to the shift pulse ST associated with the digit signal $DT_0$ so that the output is delayed by four digit time. The output of the shift register 4 appears on the line E and then the line Y. The output on the line Y is further delay by a shift register $SR_1$ by one digit time so that the output is delayed by seven digit time (4+2+1=7). Therefore, the decimal point timing information P appears at $DT_7$. In case of the dynamic display using the display device of the type shown in FIG. 15, the digit signals $DT_0$, $DT_1$, $DT_2$, . . . and $DT_n$ are sequentially applied to the common electrodes P1 to Pn from the least significant digit place. The same digit electrodes $K_H$ to $K_P$ of all digit places are connected to common lines so that when the digit signal $DT_i$ is applied, the digit and decimal point in the digit place $i$ are displayed. The information conversion circuit of the type described hereinbefore permits the dynamic display of the decimal point in addition to that of the digits. Alternatively, the dynamic decimal point timing information may be reconverted into the static decimal-point-digit-place information. That is, a decimal point timing information P is applied to an AND gate B in FIG. 17, and the AND gate B is opened at time X so that the information P may be transferred into a shift register PR. The information P is shifted in the shift register PR in response to the shift pulse ST and stopped in the digit place which corresponds to the digit place information stored in the buffer register 17. Therefore, the static decimal-point-digit-position information is stored into the shift register PR. Since the static decimal point digit place information is continuously provided, it is very advantageously used in printing. When the shift register PR is used, the dynamic display which is different from that described with reference to FIG. 15 may be accomplished. With the display device 20 shown in FIG. 15, the digit pulses $DT_0$ to $DT_n$ are sequentially applied to the common electrodes Po to Pn while the digit information is applied to the digit electrodes $K_P$ to $K_H$. Alternatively, the digit pulses $DT_0$ to $DT_n$ may be sequentially applied to the digit electrodes $K_p$, $K_O$ and $K_H$ while the digit place selection information is applied from the shift registers SR to the common electrodes Po to Pn.

We claim:

1. A system for controlling a numeral display comprising:
    a numeral display device (4, 20) having a plurality of numeral display units arrayed in parallel, each of which comprises digit display segments (A – G), a decimal point segment (P) and a digit position marking segment (H) located adjacent to and at the upper left side of said digit display segments;
    means including a digit position marking signal generator for controlling said numeral display device to display numeral information;
    a register (10) for storing the numeral information to be displayed in said numeral display device;
    means for discriminating a zero or zeros, unnecessary to display, stored in said register and for generating from a signal (ZS) having a first level representative of a display instruction and second level representative of a display suppression, a signal (ZS') converted for a most significant digit of the numeral information from the first level to the second level; and
    means for combining an output from said signal (ZS') generating means with a digit position marking signal generated in said digit position marking signal generator of said control means.

2. A system as defined in claim 1, wherein said combining means comprises an AND gate (6, 43).

3. A system as defined in claim 1, wherein said control means comprises a 3-bit recirculating register consisting of flip-flops (1, 2, 3), and said digit position marking segment of each of said display units can be driven by an output from the second flip-flop of said recirculating register.

4. A system as defined in claim 1, wherein said control means comprises a flip-flop (38) effective to be set for more than one digit time, and said digit position marking segment (H) of each of said display units can be driven by a set output of said flip-flop (38).

5. A system as defined in claim 1, wherein the system further comprises means for interleaving the second level signal between adjacent digits of the first level signal from said signal (ZS') generating means, whereby to prevent said numeral display device from overlapping the displaying the numeral information.

6. A system as defined in claim 1, wherein the system further comprises second combining means for combining the output from said signal (ZS') generating means to a numeral display control part of said control means, whereby to suppress the displaying of the undesired zero or zeros.

7. A system for controlling a numeral display comprising:
    a numeral display device (4, 20) having a plurality of numeral display units arrayed in parallel, each of which comprises digit display segments (A – G), a decimal point segment (P) and a digit position marking segment (H) located adjacent to and at the upper left side of said digit display segments;
    means including a digit position marking signal generator for controlling said numeral display device to display numeral information;
    a register (10) for storing the numeral information to be displayed in said numeral display device;
    means for discriminating a zero or zeros, unnecessary to display, stored in said register and for generating from a signal (ZS) having a first level representative of a display instruction and a second level representative of a display suppression, a signal (ZS') converted for a most significant digit of the numeral information from the first level to the second level;
    first means for combining an output from said signal (ZS') generating means with a digit position marking signal generated in said digit position marking signal generator of said control means; and
    second means for combining the output from said signal (ZS') generating means to a numeral display control part of said control means.

8. A system as defined in claim 7, wherein said first combining means comprises an AND gate (6, 43).

9. A system as defined in claim 7, wherein said second combining means comprises an AND gate (8).

10. A system as defined in claim 7, wherein said controlling means comprises one digit buffer register (17) and flip-flops (33, 38), each of which holds information for the time interval corresponding to more than one digit time during which each of said buffer register and said flip-flops generate respective output by which said digit display segments, said decimal point segment and said digit position marking segment are driven for the displaying.

11. A system as defined in claim 7, wherein said controlling means comprises a first flip-flop (30) to which is applied the output of said signal (ZS') generating means and a second flip-flop (31) to which is applied the output of said first flip-flop (30), the output of said second flip-flop (31) driving a specific display segment (G) for displaying.

12. A system for controlling a numeral display comprising:
    a register for storing binary digit numeral information;
    a buffer register for storing one digit of the information read out from said register;
    means for producing a decimal point;
    a display device for displaying the numeral information read out from said register and decoded in a decimal code form as well as the decimal point on a time division basis; and
    means for controlling said display device to display the numeral information and the decimal point for the time interval corresponding to more than one digit time, while holding said buffer register and said decimal point producing means for the time interval corresponding to more than one digit time.

13. A system as defined in claim 12, wherein said decimal point producing means comprises a flip-flop (33).

14. A system as defined in claim 12, wherein the system further comprises;
- means for generating a digit position marking signal;
- means for displaying a digit position mark or marks on said display device in response to the digit position marking signal generated; and
- means for controlling said digit position mark displaying means to display the digit position mark or marks for the time interval corresponding to more than one digit time, holding said digit position marking signal generating means for the time interval corresponding to more than one digit time.

15. A system as defined in claim 14, wherein said digit position marking signal generating means comprises a flip-flop (38).

16. A system as defined in claim 14, wherein the system further comprises means for suppressing the mark, unnecessary to display.

17. A system as defined in claim 12, wherein the system further comprises means for discriminating a zero or zeros, unnecessary to display, from the numeral information stored in said register.

18. A system as defined in claim 17, wherein said discriminating means generates, from a signal (ZS) having a first level indicative of displaying and a second level indicative of suppression of displaying, a signal (ZS') having a most significant digit of the first level signal converted into the second level signal.

19. A system as defined in claim 12, wherein said register has a recirculating loop and is in a form of bit-parallel and digit-series configuration.

20. A system for controlling a numeral display comprising:
- a register for storing binary digit numeral information;
- a buffer register for storing one digit of the information read out from said register;
- means for producing a decimal point;
- means for generating a digit position mark or marks;
- a display device for displaying the numeral information read out from said register and decoded in a decimal code form, the decimal point and the digit position mark or marks on a time division basis; and
- means for controlling said display device to display the numeral information, the decimal point and the digit position mark or marks for the time interval corresponding to more than one digit time, while holding said buffer register, said decimal point producing means and said digit position mark generating means for the time interval corresponding to more than one digit time.

21. A system as defined in claim 20, wherein said decimal point producing means comprises a first flip-flop (33) and said digit position mark generating means comprises a second flip-flop (38).

22. A system as defined in claim 20, wherein said controlling means comprises means for discriminating the digit position mark, unnecessary to display, and for suppressing the displaying of said mark.

23. A system as defined in claim 20, wherein the system further comprises means for discriminating a zero or zeros, unnecessary to display, from the numeral information stored in said register and for suppressing the displaying of said zero or zeros.

24. A system as defined in claim 20, wherein said register has a recirculating loop and is in a form of a bit-parallel and digit-series configuration.

25. A system for controlling a numeral display comprising:
- a shift register for storing binary numeral information, for shifting the numeral information from a most significant digit to a least significant digit and for recirculating the numeral information from the least significant digit to the most significant digit;
- a buffer register for storing one digit of the numeral information read out from said shift register;
- means for controlling said buffer register to sequentially store the numeral information read out from the least significant digit of said shift register into said buffer register digit by digit and to hold the numeral information for the time interval corresponding to at least more than one digit time;
- means for discriminating a zero or zeros, unnecessary to display, stored in said shift register and for generating from a signal (ZS) having a first level representative of a display instruction and a second level representative of a display suppression, a signal (ZS') having a most significant digit of the first level signal converted into the second level signal; and
- a numeral display device, to which is applied an output from said signal (ZS') generating means and an output from said buffer register, for displaying the numeral information together with a desired digit position mark or marks thereon on a time division basis.

26. A system as defined in claim 25, wherein said shift register is in a form of a bit-parallel and digit-series configuration.

27. A system as defined in claim 25, wherein said numeral display device comprises means for displaying a decimal point and means for displaying a digit position mark or marks, and wherein the system further comprises means (33) for holding a signal indicative of the decimal point for the time interval corresponding to at least more than one digit time and means (38) for holding a signal indicative of the digit position mark or marks for the time interval corresponding to at least more than one digit time.

28. A system as defined in claim 27, wherein the system further comprises means (43), to which are applied an output from said digit position mark signal holding means and an output from said signal (ZS') generating means, for suppressing the displaying of an unnecessary digit position mark or marks.

29. A system as defined in claim 25, wherein the system further comprises means for interleaving the second level signal between adjacent digits of the first level signal from said signal (ZS') generating means, whereby to prevent said numeral display device from overlapping the displaying of the numeral information.

* * * * *